US011435588B2

United States Patent
Takeda et al.

(10) Patent No.: US 11,435,588 B2
(45) Date of Patent: Sep. 6, 2022

(54) VIRTUAL IMAGE DISPLAY APPARATUS AND LIGHT-GUIDING DEVICE

(71) Applicant: SEIKO EPSON CORPORATION, Tokyo (JP)

(72) Inventors: Takashi Takeda, Suwa (JP); Masayuki Takagi, Azumino (JP); Toshiaki Miyao, Matsumoto (JP); Tokito Yamaguchi, Azumino (JP)

(73) Assignee: SEIKO EPSON CORPORATION, Tokyo (JP)

( * ) Notice: Subject to any disclaimer, the term of this patent is extended or adjusted under 35 U.S.C. 154(b) by 69 days.

(21) Appl. No.: 17/004,099

(22) Filed: Aug. 27, 2020

(65) Prior Publication Data

US 2021/0063749 A1 Mar. 4, 2021

(30) Foreign Application Priority Data

Aug. 28, 2019 (JP) .............................. JP2019-155538

(51) Int. Cl.
*G02B 27/01* (2006.01)
*G02B 5/04* (2006.01)

(52) U.S. Cl.
CPC ........... *G02B 27/0172* (2013.01); *G02B 5/04* (2013.01); *G02B 2027/0187* (2013.01)

(58) Field of Classification Search
CPC ............ G02B 27/0172; G02B 27/0025; G02B 27/005; G02B 5/04; G02B 2027/0187; G02B 2027/0132; G02B 2027/0178; G02B 17/0816
See application file for complete search history.

(56) References Cited

U.S. PATENT DOCUMENTS

| 5,687,025 A | 11/1997 | Nanba | |
| 2013/0222896 A1* | 8/2013 | Komatsu | G02B 27/017 |
| | | | 359/365 |
| 2018/0067290 A1* | 3/2018 | Takahashi | G02B 17/086 |
| 2018/0143427 A1* | 5/2018 | Griffin | G02B 27/0149 |

FOREIGN PATENT DOCUMENTS

JP H09-043536 A 2/1997

* cited by examiner

*Primary Examiner* — Alexander Eisen
*Assistant Examiner* — Kebede T Teshome
(74) *Attorney, Agent, or Firm* — Oliff PLC

(57) ABSTRACT

A virtual image display apparatus includes a display element, a projection lens configured to converge image light emitted from the display element, a prism configured to cause the image light by an internal reflecting surface thereof and moreover emit the image light from an emission surface thereof while refracting the image light, and a see-through mirror configured to reflect the image light emitted from the prism toward a pupil position. The projection lens, the prism, and the see-through mirror are arranged to form an off-axis system. AT an off-axis surface of the off-axis system, an intermediate pupil is arranged between the projection lens and the internal reflecting surface, with the intermediate pupil being arranged to be farther to the incident surface side of the prism than to the projection lens and the internal reflecting surface, and an intermediate image is formed between the prism and the see-through mirror.

17 Claims, 6 Drawing Sheets

VIRTUAL IMAGE DISPLAY APPARATUS AND LIGHT-GUIDING DEVICE

The present application is based on, and claims priority from JP Application Serial Number 2019-155538, filed Aug. 28, 2019, the disclosure of which is hereby incorporated by reference herein in its entirety.

BACKGROUND

1. Technical Field

The present disclosure relates to a virtual image display apparatus such as a head-mounted display and a light-guiding device incorporated therein, and more particularly, to a virtual image display apparatus capable of providing see-through view.

2. Related Art

Various types of a virtual image display apparatus in which imaging light from a display element is guided to a pupil of an observer by an optical element such as a mirror are proposed as a virtual image display apparatus, which enables formation and observation of a virtual image, like a head-mounted display.

An ocular optical system described in JP-A-9-43536 includes an image display device, a relay optical system that performs intermediate image formation of a display image generated by the image display device, and an ocular reflecting surface that guides light flux from the intermediate image to an eye point. Here, the relay optical system includes a refraction optical system and a relay reflecting surface. The relay reflecting surface and the ocular reflecting surface are eccentric, and each include an anamorphic aspherical surface shape.

In a case of a see-through virtual image apparatus that enables external matters to be visually recognized, a region for visually recognizing the external matters is required to be secured, and arrangement of optical components is limited. Thus, it is not easy to achieve size reduction while securing optical performance. Particularly, in a case where size reduction of the head-mounted display is to be achieved, when a display element and an following optical element are increased in size, for example, a thickness of the optical system in a front-rear direction is increased, and a part expanding in a periphery of the ocular reflecting surface or the see-through mirror in front of an eye is increased. Thus, when a third person sees a user wearing the device from the outside, it is highly possible for the third person to have strange feelings because the device is arranged in front of a face of the user.

In the device in JP-A-9-43536, aberration is corrected by providing an anamorphic aspherical surface to the relay reflecting surface and the ocular reflecting surface. However, an optical path from the image display device to the refraction optical system is long, and aberration correction performed by a small number of optical elements is limited. Thus, size reduction cannot be achieved while securing a resolution.

SUMMARY

A virtual image display apparatus according to an aspect of the present disclosure includes a display element, a projection lens configured to converge image light emitted from the display element, a prism configured to cause the image light emitted from the projection lens to enter an incident surface thereof while refracting the image light and totally reflect the image light by an internal reflecting surface thereof and moreover emit the image light from an emission surface thereof while refracting the image light, and a see-through mirror configured to reflect the image light emitted from the prism toward a pupil position. The projection lens, the prism, and the see-through mirror are arranged to form an off-axis system. At an off-axis surface of the off-axis system, an intermediate pupil is arranged between the projection lens and the internal reflecting surface, with the intermediate pupil being arranged to be farther to the incident surface side of the prism than to the projection lens and the internal reflecting surface, and an intermediate image is formed between the prism and the see-through mirror, with the intermediate image being formed by image formation by the image light.

DESCRIPTION OF EXEMPLARY EMBODIMENTS

First Embodiment

Now, with reference to the drawings, a virtual image display apparatus and a light-guiding device incorporated therein according to a first exemplary embodiment of the present disclosure are described.

Figure 1:
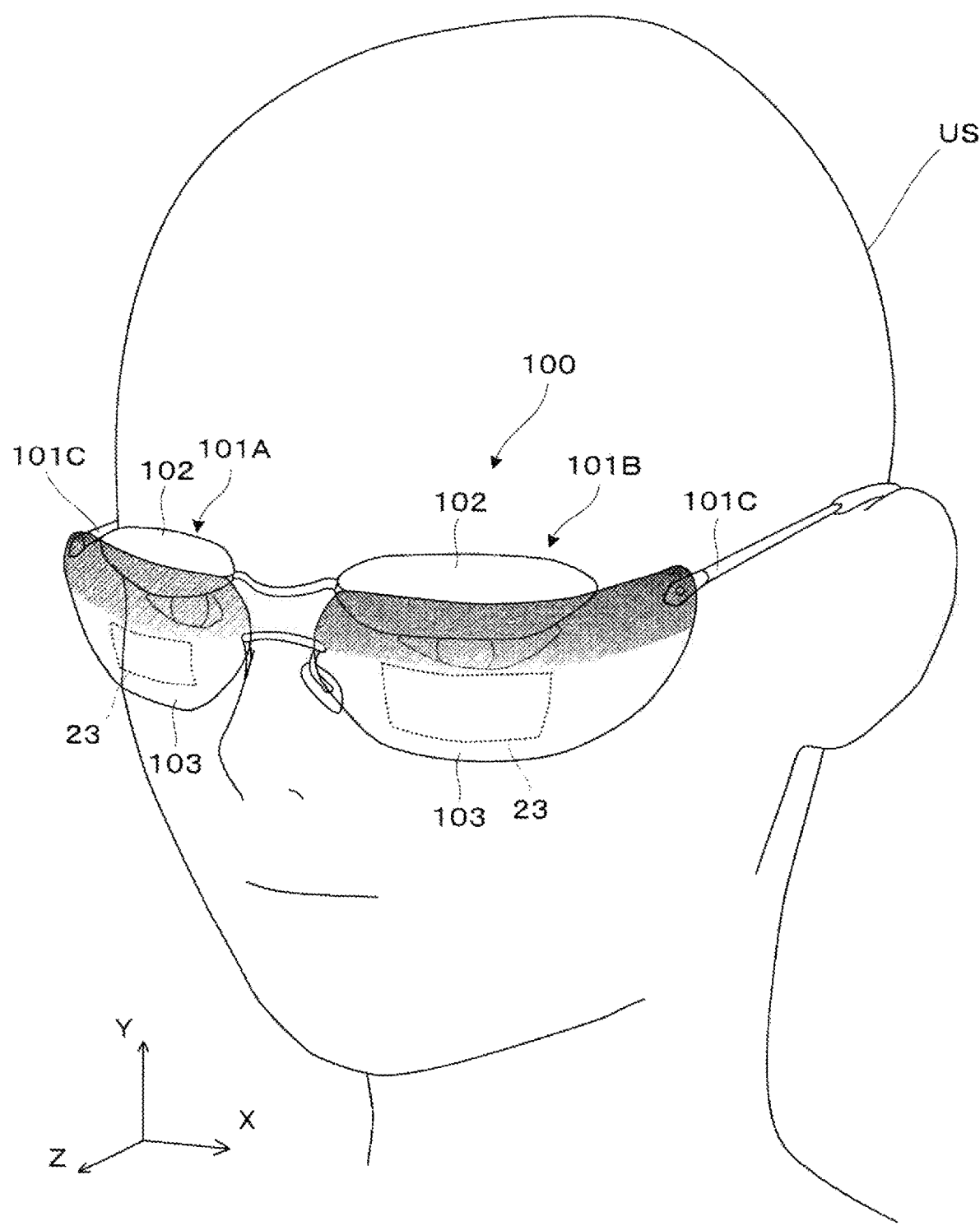
FIG. 1 is an external perspective view illustrating a state in which a virtual image display apparatus according to a first exemplary embodiment is worn.
Figure 2:
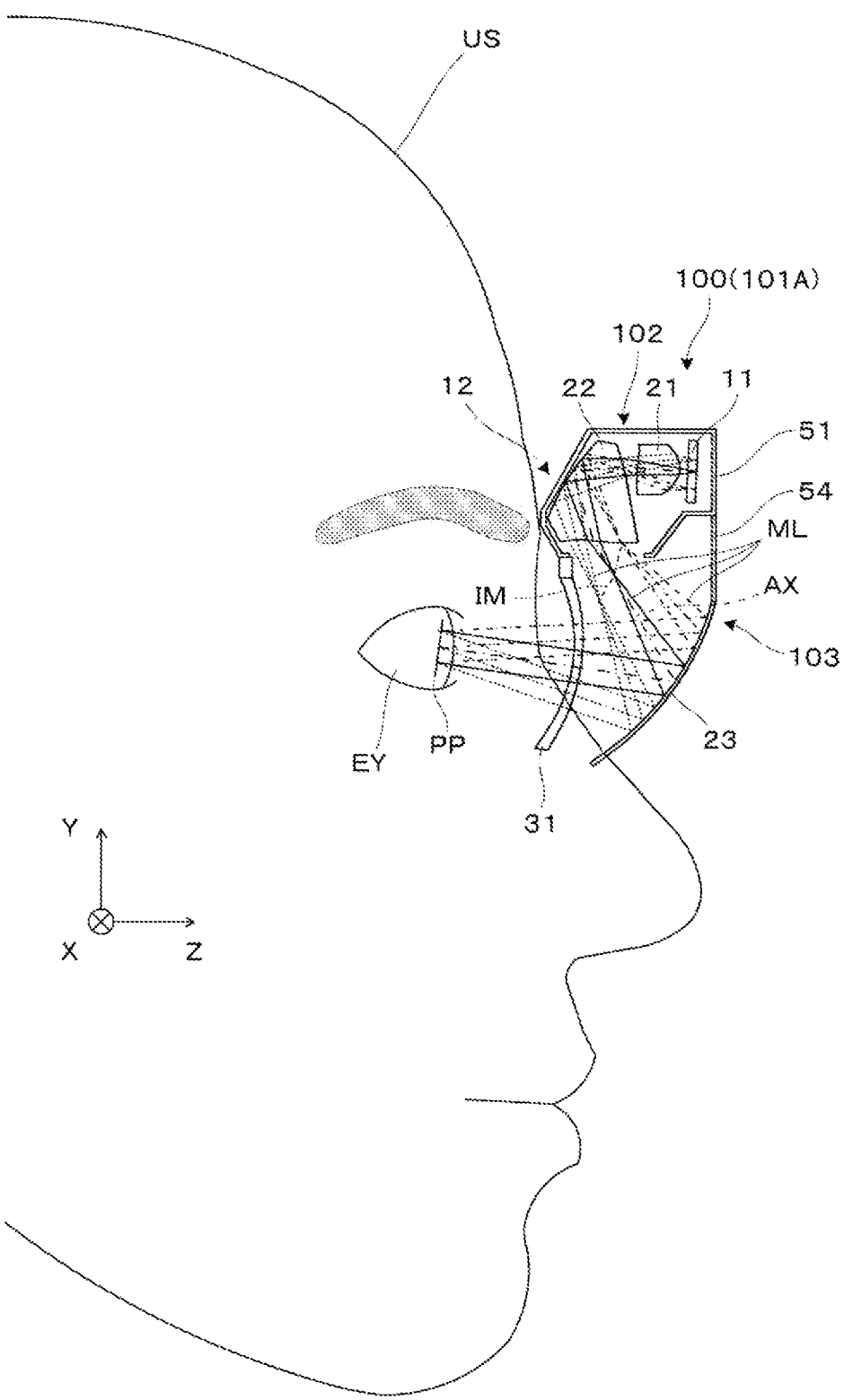
FIG. 2 is a side cross-sectional view illustrating the virtual image display apparatus illustrated in FIG. 1.

As illustrated in FIG. 1 and FIG. 2, a virtual image display apparatus 100 according to the first exemplary embodiment is a head-mounted display (HMD) having an appearance similar to eye glasses, and causes an observer or a user US wearing the apparatus to recognize an image being a virtual image. In FIG. 1 and FIG. 2, X, Y, and Z are an orthogonal coordinate system, a +X direction corresponds to a lateral direction in which both eyes of the user US wearing the virtual image display apparatus 100 are aligned, a +Y direction corresponds to an upward direction orthogonal to the lateral direction in which both the eyes of the user US are aligned, and a +Z direction corresponds to a front direction or a front surface direction of the user US.

The virtual image display apparatus 100 includes a first display device 101A that forms a virtual image with respect to a right eye, a second display device 101B that forms a virtual image with respect to a left eye, and temple-like support devices 101C that support both the display devices 101A and 101B. The first display device 101A includes an optical unit 102 arranged at an upper part and an external member 103 that has an eyeglass lens-like shape and covering the entirety. Similarly, the second display device 101B includes an optical unit 102 arranged at an upper part and an external member 103 that has an eyeglass lens-like shape and covering the entirety. The support devices 101C support both the display devices 101A and 101B at upper end sides of the external members 103 with members (not shown) arranged on back sides of the external members 103. The second display device 101B for the left eye has a structure similar to that of the first display device 101A. In the following, the first display device 101A is described, and description for the second display device 101B is omitted.

Figure 3:
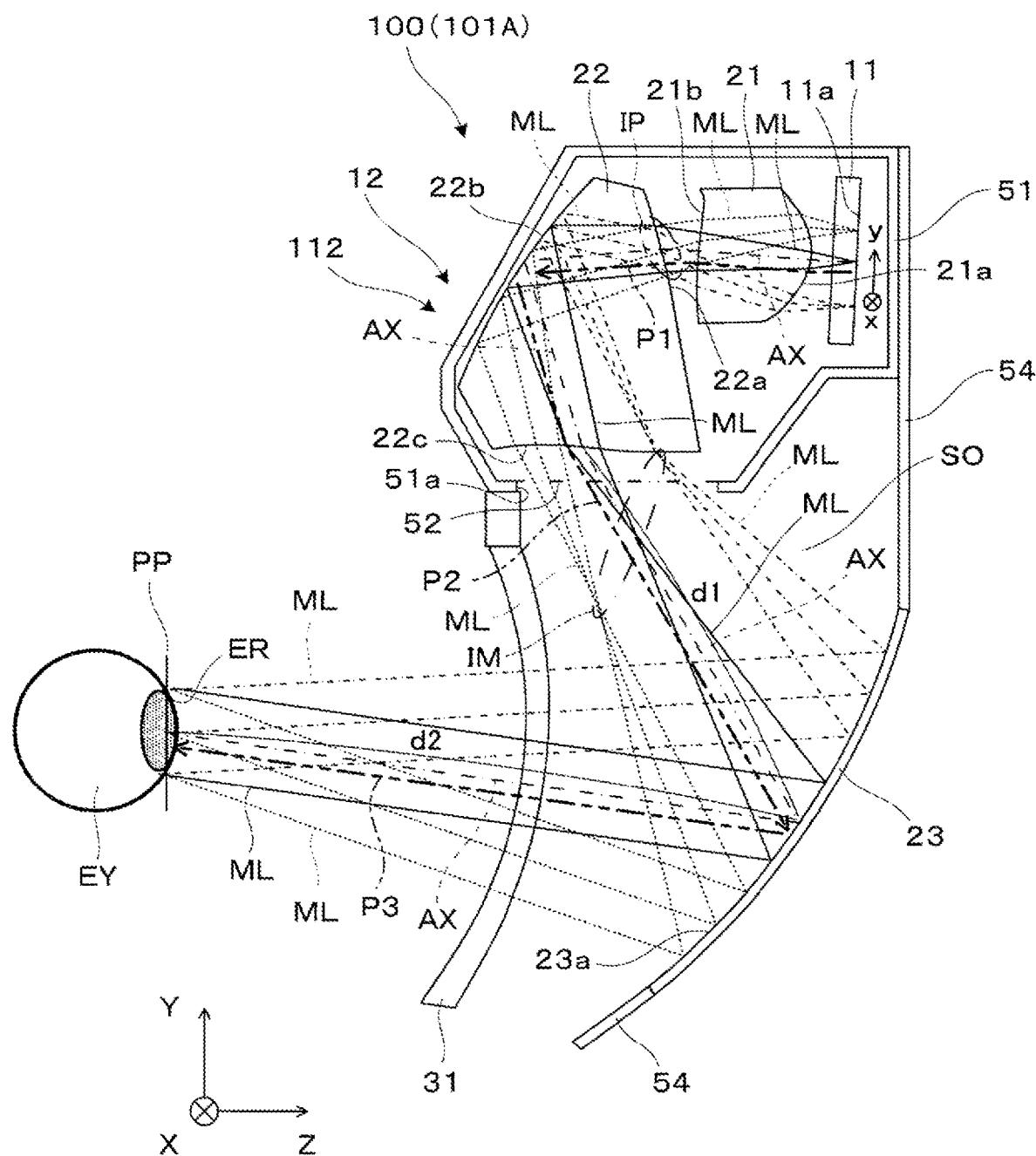
FIG. 3 is a side cross-sectional view illustrating an internal structure of the virtual image display apparatus.

As illustrated in FIG. 2 and FIG. 3, the first display device 101A for the right eye includes a display element 11 and a projection optical system 12 as optical elements. The projection optical system 12 is also referred to as a light-guiding device in terms of guiding imaging light ML from the display element 11 to a pupil position PP.

The display element 11 is a self-luminous type display device typified by, for example, an organic electro-luminescence (organic EL), an inorganic EL, an LED array, an organic LED, a laser array, and a quantum dot emission type element, and forms a still image or a moving image in color on a two-dimensional display surface 11a. The display element 11 is driven by a drive control circuit (not shown), and performs a display operation. When an organic EL display or a display device is used as the display element 11, the display element 11 includes an organic EL control unit. When a quantum dot display is used as the display element 11, the display element 11 emits green or red color by causing light of a blue light emitting diode (LED) to pass through a quantum dot film. The display element 11 is not limited to a self-luminous display element, and may be constituted by an LCD or other light modulating elements, and may form an image by illuminating the light modulating element with a light source such as a backlight. As the display element 11, a liquid crystal on silicon (LCOS, LCoS is a trade name), a digital micromirror device, and the like may be used instead of the LCD.

As illustrated in FIG. 3, the projection optical system (light-guiding device) 12 includes a projection lens 21, a prism 22, and a see-through mirror 23. The projection lens 21 condenses the image light ML emitted from the display element 11 in a state close to a parallel light flux. In the illustrated example, the projection lens 21 is a single lens, and includes an incident surface 21a and an emission surface 21b. The prism 22 includes the incident surface 22a, an internal reflecting surface 22b, and an emission surface 22c. The image light ML emitted from the projection lens 21 enters the incident surface 22a while being refracted, is totally reflected by the internal reflecting surface 22b, and is emitted from the emission surface 22c while being refracted. The see-through mirror 23 reflects the image light ML, which is emitted from the prism 22, toward the pupil position PP. The pupil position PP is a position that the image light from each point on the display surface 11a enters in a predetermined diverging state or a parallel state from an angle direction corresponding to a position of each point on the display surface 11a in a superimposing manner. The projection optical system 12 that is illustrated has a field of view (FOV) of 44 degrees. The display area for the virtual image, which is performed by the projection optical system 12, is rectangular, and 44 degrees described above corresponds to a diagonal direction.

The projection lens 21 and the prism 22 are accommodated in a case 51 together with the display element 11. The case 51 is formed of a material having a light shielding property, and includes a drive circuit (not shown) for operating the display element 11, which is built therein. An opening 51a of the case 51 has a size that does not blocks the image light ML from the prism 22 toward the see-through mirror 23. The opening 51a of the case 51 may not be a simple opening, but may be covered with a light-transmissive protection cover 52. The protection cover 52 is formed of a resin material or the like that does not have optical power and causes the image light ML to pass through without attenuation. The accommodation space in the case 51 can be sealed with the protection cover 52, and functions such as dust proof, dew proof, and prevention of contact on an optical surface can be enhanced. The case 51 supports the see-through mirror 23 through intermediation of a support plate 54. The case 51 or the support plate 54 is supported by the support devices 101C illustrated in FIG. 1, and the external member 103 is constituted by the support plate 54 and the see-through mirror 23.

The projection optical system 12 is an off-axis optical system, and the projection lens 21, the prism 22, and the see-through mirror 23 are arranged to form an off-axis system 112. The expression that the projection optical system 12 is an off-axis optical system indicates that an optical path as a whole is refracted before or after a light beam enters at least one reflecting surface of a refracting surface in the optical elements 21, 22, and 23 constituting the projection optical system 12. In the projection optical system 12, that is, the off-axis system 112, an optical axis AX is refracted, and thus the optical axis AX extends along an off-axis surface SO corresponding to the paper sheet. Specifically, in the projection optical system 12, the optical axis AX is refracted in the off-axis surface SO, and thus the optical elements 21, 22, and 23 are arrayed along the off-axis surface SO. The off-axis surface SO is a surface that causes asymmetry in the off-axis system 112 at multi steps. The optical axis AX extends along an optical path of a main optical beam emitted from the center of the display element 11, and passes through an eye ring ER corresponding to an eye point or the center of the eye. Specifically, the off-axis surface SO on which the optical axis AX is arranged is parallel with a YZ plane, and passes through the center of the display element 11 and the center of the eye ring ER corresponding to an eye point. When seen in a lateral cross-section, the optical axis AX is arranged in a Z-like shape. Specifically, on the off-axis surface SO, an optical path P1 from the projection lens 21 to the internal reflecting surface 22b, an optical path P2 from the internal reflecting surface 22b to the see-through mirror 23, an optical path P3 from the see-through mirror 23 to the pupil position PP are arranged to be folded twice in a Z-like shape.

In the projection optical system 12, the optical path P1 from the projection lens 21 to the internal reflecting surface 22b is close to a state parallel with the Z direction. Specifically, in the optical path P1, the optical axis AX extends substantially parallel with the Z direction or the front surface direction. As a result, the projection lens 21 is arranged to be sandwiched between the prism 22 and the display element 11 with respect to the Z direction or the front surface direction. In this case, the optical path P1 from the prism 22 to the display element 11 is close to the front surface direction. The optical axis AX in the optical path P1 preferably falls within a range of from approximately −30 degrees to +30 degrees on average with a downward direction in the Z direction corresponds to a negative. The optical axis AX in the optical path P1 is in a downward state in the Z direction at −30 degrees or more, and thus the projection lens 21 and the display element 11 can be prevented from interfering with the see-through mirror 23. Further, the optical axis AX in the optical path P1 is in an upward state in the Z direction at +30 degrees or less, and thus the projection lens 21 and the display element 11 can be prevented from protruding upward and being conspicuous on appearance. In the optical path P2 from the internal reflecting surface 22b to the see-through mirror 23, the optical axis AX preferably falls within a range of from approximately −70 degrees to −45 degrees on average with the downward direction in the Z direction corresponds to a negative. The optical axis AX in the optical path P2 is in a downward state in the Z direction at −70 degrees or more. Thus, a space for arranging an inner lens 31 can be secured between the see-through mirror 23 and the pupil position PP, the entire inclination of the see-through mirror 23 can be prevented from being excessively increased. Further, the optical axis AX in the optical path P2 is in a downward state in the Z direction at −45 degrees or less. Thus, the prism 22 can be prevented from being arranged to largely protrude with respect to the see-through mirror 23 in − the Z direction or the back surface direction, and the projection optical system 12 can be prevented from being increased in thickness. The optical path P3 from the see-through mirror 23 to the pupil position PP is close to a state parallel with the Z direction. In the illustrated example, the optical axis AX is at approximately −10 degrees with the downward direction in the Z direction corresponds to a negative. This is because a human line-of-sight is stabilized with slightly downcast eyes, which are inclined downward from the horizontal direction at approximately 10 degrees. Note that a center axis HX in the horizontal direction with respect to the pupil position PP is set by assuming that the user US wearing the virtual image display apparatus 100 gazes steadily in the horizontal direction or the horizontal line while facing the front in an upright posture and in a relaxed state. A shape and a posture of a head including arrangement of eyes, arrangement of ears, and the like vary depending on users US wearing the virtual image display apparatus 100.

By assuming an average head shape and head posture of the users US, the average center axis HX can be set for the subject virtual image display apparatus 100. As a result from the description given above, on the internal reflecting surface 22b of the prism 22, a reflection angle of a light beam along the optical axis AX is approximately from 10 degrees to 60 degrees. Further, on the see-through mirror 23, the reflection angle of the light beam along the optical axis AX is approximately from 20 degrees to 45 degrees.

With regard to the optical path P2 and the optical path P3 of the main optical beam, a distance d1 between the see-through mirror 23 and the prism 22 is equal to or less than a distance d2 between the see-through mirror 23 and the pupil position PP. In this case, a projection amount by which the prism 22 protrudes in a periphery of the see-through mirror 23, that is, protrudes upward can be suppressed. Here, the distances d1 and d2 are considered on the optical axis AX. When an additional optical element is arranged on the optical paths P2 and P3 on an inner side of the see-through mirror 23, the optical element is converted into an optical length or an optical distance, and values for the distances d1 and d2 are determined.

In the projection optical system 12, the position of the light beam passing through the uppermost side in the vertical direction is equal to or less than 30 mm with respect to the vertical direction or the Y direction with the center of the pupil position PP as a reference. When the light beam falls within the range described above, the projection lens 21 and the display element 11 can be prevented from being arranged to protrude in the upward direction or +the Y direction, and an amount by which the projection lens 21 and the display element 11 expand upward of an eyebrow can be suppressed. With this, designability can be secured. Specifically, the optical unit 102 including the display element 11, the projection lens 21, and the prism 22 can be reduced in size. In the projection optical system 12, the position of all the light beams from the see-through mirror 23 to the display element 11 is 13 mm or more with respect to the front surface direction or the Z direction with the pupil position PP as a reference. The light beams fall within the range described above. With this, particularly, the see-through mirror 23 can be arranged to be sufficiently away from the pupil position PP in the front surface direction or +the Z direction, and the space for arranging the inner lens 31 is easily secured behind the see-through mirror 23. In the projection optical system 12, the position of all the light beams from the see-through mirror 23 to the display element 11 is 40 mm or less with respect to the front surface direction or the Z direction with the pupil position PP as a reference. The light beams fall within the range described above. With this, particularly, the see-through mirror 23 can be arranged not to be excessively away from the pupil position PP in the front surface direction or +the Z direction, and the see-through mirror 23, the display element 11, and the like are prevented from protruding frontward. Thus, designability is secured easily. The lower end of the prism 22 is arranged at the position of 10 mm or more with respect to the vertical direction or the Y direction with the center of with the pupil position PP as a reference. With this, for example, a see-through visual field in the upward direction at 20 degrees is secured easily.

On the off-axis surface SO, an intermediate pupil IP is arranged between the projection lens 21 and the internal reflecting surface 22b of the prism 22 on a side closer to the incident surface 22a of the prism 22 with respect to the projection lens 21 and the internal reflecting surface 22b. More specifically, the intermediate pupil IP is arranged at the position of or in the vicinity of the incident surface 22a of the prism 22. For example, the intermediate pupil IP is arranged on a side of the internal reflecting surface 22b with respect to the incident surface 22a of the prism 22. In this case, the position of the intermediate pupil IP is in a state closer to the incident surface 22a with respect to the internal reflecting surface 22b. The intermediate pupil IP may be arranged on a side closer to the projection lens 21 with respect to the incident surface 22a of the prism 22. In this case, the position of the intermediate pupil IP is a state closer to the incident surface 22a with respect to the emission surface 21b of the projection lens 21. The intermediate pupil IP may intersect the incident surface 22a of the prism 22. The intermediate pupil IP indicates a position at which the image light from each point on the display surface 11a spreads most largely and overlaps with each other, and is arranged at a conjugate point with the eye ring ER or the pupil position PP. At the position of the intermediate pupil IP or in the vicinity thereof, an aperture stop is preferably arranged.

An intermediate image IM is formed between the prism 22 and the see-through mirror 23. The intermediate image IM is formed closer to the prism 22 with respect to the see-through mirror 23. As described above, the intermediate image IM is formed to be close to the prism 22 with respect to the see-through mirror 23. With this, a load of magnification due to the see-through mirror 23 is reduced, and hence aberration of a virtual image to be observed can be suppressed. However, the intermediate image IM is not in a state of intersecting the emission surface 22c of the prism 22. Specifically, the intermediate image IM is formed on the outer side of the emission surface 22c, and the arrangement relationship is established not only on the off-axis surface SO but also at a free-selected point on the emission surface 22c in the lateral direction or the X direction perpendicular to the off-axis surface SO. As described above, the intermediate image IM is formed not to transect the emission surface 22c of the prism 22. With this, dust or scratches on the surface of the emission surface 22c can be easily prevented from affecting image formation. The intermediate image IM is an actual image formed at a conjugate position with respect to the display surface lla on the optical upstream to the eye ring ER, and has a pattern corresponding to a display image on the display surface lla. However, the intermediate image IM is not required to be formed sharply, and may express various types of aberration such as field curvature and distortion aberration. When aberration is satisfactorily corrected for a virtual image to be observed at the pupil position PP at the final stage, aberration of the intermediate image IM does not cause any problem.

Figure 4:
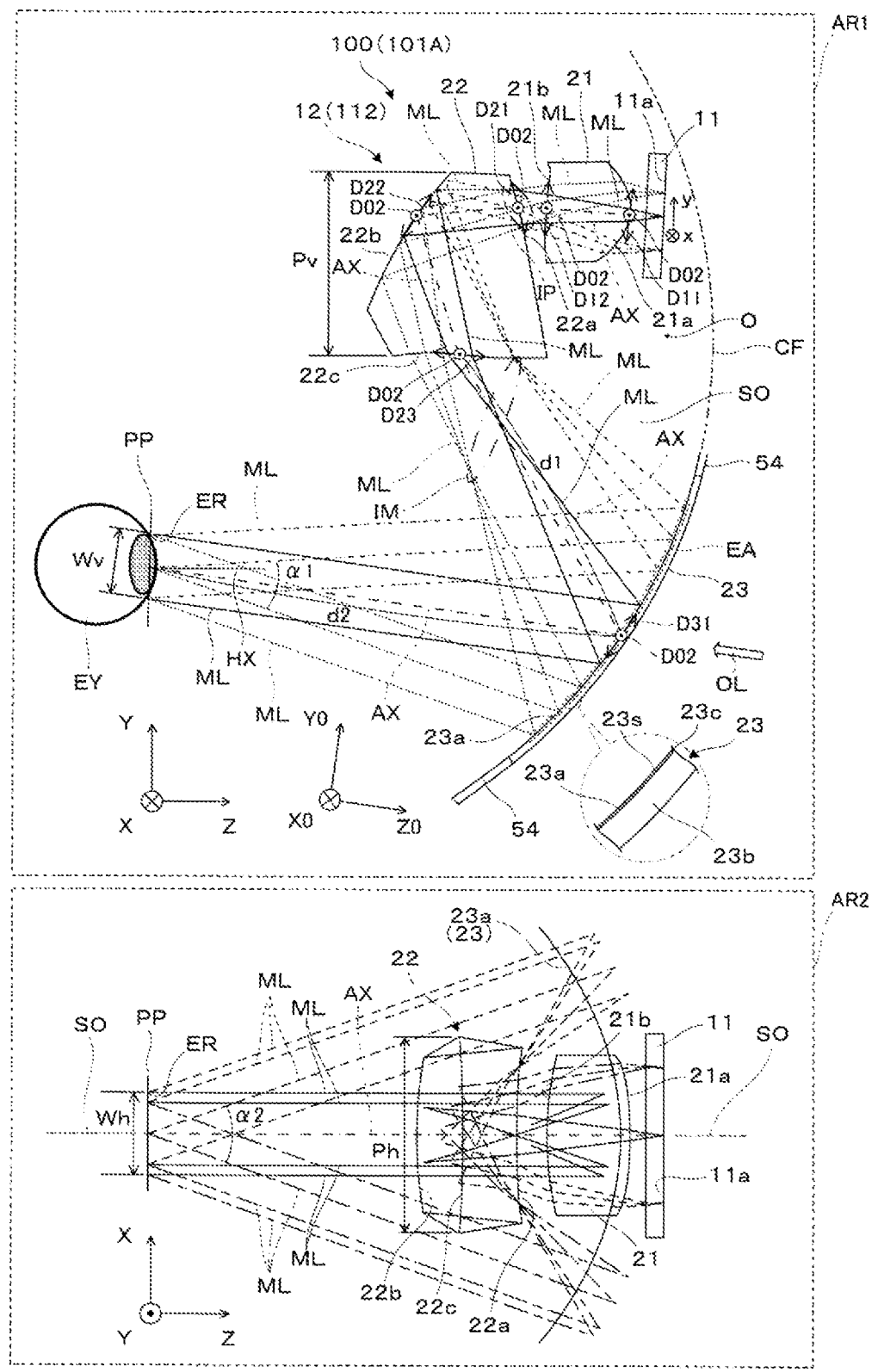
FIG. 4 is a side cross-sectional view and a plan view illustrating an optical system of the apparatus illustrated in FIG. 1.

With reference to FIG. 4, shapes of the projection lens 21, the prism 22, and the see-through mirror 23 are described in detail. In FIG. 4, an area AR1 indicates a side cross-sectional view of the projection optical system 12, and an area AR2 indicates a plan view of the projection optical system 12. Note that, in the area AR2, the optical surfaces 21a and 21b of the projection lens 21, the optical surfaces 22a, 22b, and 22c of the prism 22, and a reflecting surface 23a of the see-through mirror 23 are illustrated as surfaces projected on the XZ plane after passing through the optical axis AX.

In this case, the projection lens 21 is constituted by a single lens. The incident surface 21a and the emission surface 21b being optical surfaces constituting the projection lens 21 are asymmetric across the optical axis AX with respect to first vertical directions D11 and D12 intersecting the optical axis AX on the off-axis surface SO in parallel with the YZ plane, and are symmetric across the optical axis AX with respect to a second lateral direction D02 or the X direction orthogonal to the first directions D11 and D12. The first vertical direction D11 with respect to the incident surface 21a and the second vertical direction D12 with respect to the emission surface 21b form a predetermined angle. The projection lens 21 is made of, for example, a resin, but may also be made of glass. For example, the incident surface 21a and the emission surface 21b of the projection lens 21 are free curved surfaces. The incident surface 21a and the emission surface 21b are not limited to free curved surfaces, and may be aspherical surfaces. In the projection lens 21, aberration can be reduced by setting the incident surface 21a and the emission surface 21b to be a free curved surface or an aspherical surface, and, particularly when a free curved surface is used, aberration of the projection optical system 12 being an off-axis optical system or a non-coaxial optical system can be easily reduced. Note that the free curved surface is a surface without an axis of rotational symmetry, and various polynomials may be used as a surface function of the free curved surface. In addition, the aspherical surface is a surface having an axis of rotational symmetry, but is a paraboloid or a surface other than a spherical surface expressed by a polynomial. Detailed description is omitted, but an antireflective film is formed on the incident surface 21a and the emission surface 21b.

As described above, on the projection lens 21, the first direction D11 of the incident surface 21a and the second direction D12 of the emission surface 21b form the predetermined angle. As a result, with regard to the optical path of the main optical beam from the center of the display surface 11a of the display element 11, the emission surface 21b is formed to be inclined with respect to the incident surface 21a. Specifically, a relative angle or inclination is present between the incident surface 21a and the emission surface 21b. The projection lens 21 may have a function of partially compensating eccentricity of the projection optical system 12 as the off-axis system 112, which contributes to improvement in various aberration. Further, relative inclination of the incident surface 21a and the emission surface 21b may cause the projection lens 21 to have a function of partially compensating color aberration.

The prism 22 is a refraction/reflection optical member having a function obtained by combining a mirror and a lens, and refracts and reflects the image light ML from the projection lens 21. More specifically, the image light ML enters the inside of the prism 22 through the incident surface 22a being a refracting surface, is totally reflected by the internal reflecting surface 22b being a reflecting surface in an irregular reflection direction, and is emitted to the outside through the emission surface 22c being a refracting surface. The incident surface 22a and the emission surface 22c are optical surfaces formed of curved surfaces, and contribute to improvement of a resolution as compared to a case where only a reflecting surface is adopted or flat surfaces are adopted. The incident surface 22a, the internal reflecting surface 22b, and the emission surface 22c being optical surfaces constituting the prism 22 are asymmetric across the optical axis AX with respect to first vertical directions D21, D22, and D23 intersecting the optical axis AX on the off-axis surface SO in parallel with the YZ plane, and are symmetric across the optical axis AX with respect to the second lateral direction D02 or the X direction orthogonal to the first directions D21, D22, and D23. The prism 22 has a lateral width Ph in the lateral direction or the X direction, which is larger than a vertical width Pv in the vertical direction or the Y direction. With regard to an optically effective area of the prism 22 as well as its appearance, the lateral width in the lateral direction or the X direction is larger than the vertical width in the vertical direction or the Y direction. With this, an angle of view in the lateral direction or the Y direction can be increased. Further, as described later, even when a line-of-sight is largely changed in a lateral direction correspondingly to an eye EY that moves largely in a lateral direction, an image can be visually recognized.

The prism 22 is made of, for example, a resin, but may also be made of glass. A refractive index of the prism 22 itself is set to a value that enables total reflection on the internal surface in consideration of a reflection angle of the image light ML. A refractive index and an abbe number of the prism 22 itself are preferably set in consideration with a relationship with the projection lens 21. Particularly, when an abbe number of the prism 22 and the projection lens 21 is increased, color chromatic dispersion remaining as a whole is reduced. For example, the optical surfaces of the prism 22, specifically, the incident surface 22a, the internal reflecting surface 22b, and the emission surface 22c are free curved surfaces. The incident surface 22a, the internal reflecting surface 22b, and the emission surface 22c are not limited to free curved surfaces, and may be aspherical surfaces. In the prism 22, aberration reduction can be achieved by setting the optical surfaces 22a, 22b, and 22c to be a free curved surface or an aspherical surface, and, particularly when a free curved surface is used, aberration of the projection optical system 12 being an off-axis optical system or a non-coaxial optical system can be easily reduced. With this, a resolution can be improved. The internal reflecting surface 22b is not limited to a reflecting surface that reflects the image light ML with total reflection, and may be a reflecting surface formed of a metal film or a dielectric multilayer film. In this case, on the internal reflecting surface 22b, a reflecting film formed of a single film or a multilayer film formed of metal such as Al and Ag is formed by vapor deposition or the like, or a sheet-like reflecting film formed of metal is attached. Detailed description is omitted, but an antireflective film is formed on the incident surface 22a and the emission surface 22c.

With regard to the prism 22, the incident surface 22a, the internal reflecting surface 22b, and the emission surface 22c can be collectively formed by injection molding. Thus, the number of components can be reduced, and relative positions of the three surfaces can be highly accurate at a level of, for example, 20 μm or less at a relatively low cost.

The see-through mirror 23 is a plate-like optical member that functions as a concave surface mirror, and reflects the imaging light ML from the prism 22. The see-through mirror 23 covers the pupil position PP at which the eye EY or the pupil is arranged, and has a concave shape recessed toward the pupil position PP. The see-through mirror 23 is a mirror plate having a structure in which a mirror film 23c is formed on one surface 23s of a plate-like body 23b. The reflecting surface 23a of the see-through mirror 23 is transmissive front reflecting surface. The see-through mirror 23 and the reflecting surface 23a are asymmetric across the optical axis AX with respect to a first vertical direction D31 intersecting the optical axis AX on the off-axis surface SO in parallel with the YZ plane, and is symmetric across the optical axis AX with respect to the second lateral direction D02 or the X direction orthogonal to the first direction D31. The reflecting surface 23a of the see-through mirror 23 is, for example, a free curved surface. The reflecting surface (front reflecting surface) 23a is not limited to a free curved surface, and may be an aspherical surface. Aberration can be reduced by setting the see-through mirror 23 to be a free curved surface or an aspherical surface, and, particularly when a free curved surface is used, aberration of the projection optical system 12 being an off-axis optical system or a non-coaxial optical system can be easily reduced. When the reflecting surface 23a is any one of a free curved surface and an aspherical surface, the see-through mirror 23 has a shape in which an original point O in a curved surface expression is shifted to a side of the projection lens 21 or a side of the display element 11 with respect to an effective area EA of the see-through mirror 23. In this case, without putting an excessive load to design of the optical system, an inclination surface of the see-through mirror, which achieves the Z-like shape optical paths, can be set. The curved surface expression of the reflecting surface 23a described above is as indicated with the two-dot dashed curved line CF on the off-axis surface SO, for example. Thus, the original point O providing symmetry is arranged between the upper end of the see-through mirror 23 and the lower end of the display element 11.

The see-through mirror 23 is a transmissive type reflection element that cause light to partially pass through at the time of reflection, and the mirror film 23c of the see-through mirror 23 has semi-transmissive property. With this, external light OL passes through the see-through mirror 23, and thus see-through view of externals is enabled, and a virtual image can be superimposed on an external image. At this time, when the plate-like body 23b has a thickness of less than or equal to approximately few millimeters, a change in magnification of the external image can be suppressed to low. A reflectance of the mirror film 23c with respect to the imaging light ML and the external light OL is set to fall within a range of from 10% to 50% in a range of an incident angle of the assumed imaging light ML in terms of securing luminance of the imaging light ML and facilitating observation of an external image by see-through. The plate-like body 23b being a base material of the see-through mirror 23 is made of, for example, a resin, but may also be made of glass. The plate-like body 23b is formed of the same material as that of the support plate 54 supporting the plate-like body 23b from the periphery, and has the same thickness as the support plate 54. The mirror film 23c is formed of, for example, a dielectric multilayer film including a plurality of dielectric layers having a film thickness adjusted. The mirror film 23c may also be a single layer film or a multilayer film made of metal such as Al and Ag having a film thickness adjusted. The mirror film 23c may be formed by lamination, but may also be formed by bonding a sheet-like reflecting film.

Description is made on the optical paths. The image light ML from the display element 11 enters the projection lens 21, and is emitted in a substantially collimated state. The image light ML passing through the projection lens 21 enters the prism 22, is refracted and emitted from the incident surface 21a, is reflected by the internal reflecting surface 22b at a reflectance close to 100%, and is refracted by the emission surface 22c again. The imaging light ML from the prism 22 enters the see-through mirror 23, and is reflected by the reflecting surface 23a at a reflectance of approximately 50% or less. The image light ML reflected by the see-through mirror 23 enters the pupil position PP at which the eye EY or the pupil of the user US is arranged. the intermediate image IM is formed close to the emission surface 22c of the prism 22 between the prism 22 and the see-through mirror 23. The intermediate image IM is obtained by appropriately enlarging an image formed on the display surface 11a of the display element 11. The external light OL that passes through the see-through mirror 23 and the support plate 54 in the periphery also enters the pupil position PP. Specifically, the user US wearing the virtual image display apparatus 100 can observe a virtual image formed by the image light ML in a superimposing manner with the external image.

As apparent from comparison between the areas AR1 and AR2 in FIG. 4, in the FOV of the projection optical system 12, a lateral visual field angle α1 is larger than a vertical visual field angle α2. This corresponds to the fact that a display image formed on the display surface 11a of the display element 11 is elongated in the horizontal direction. A width-to-height aspect ratio is set to a value of, for example, 4:3 or 16:9.

Figure 5:
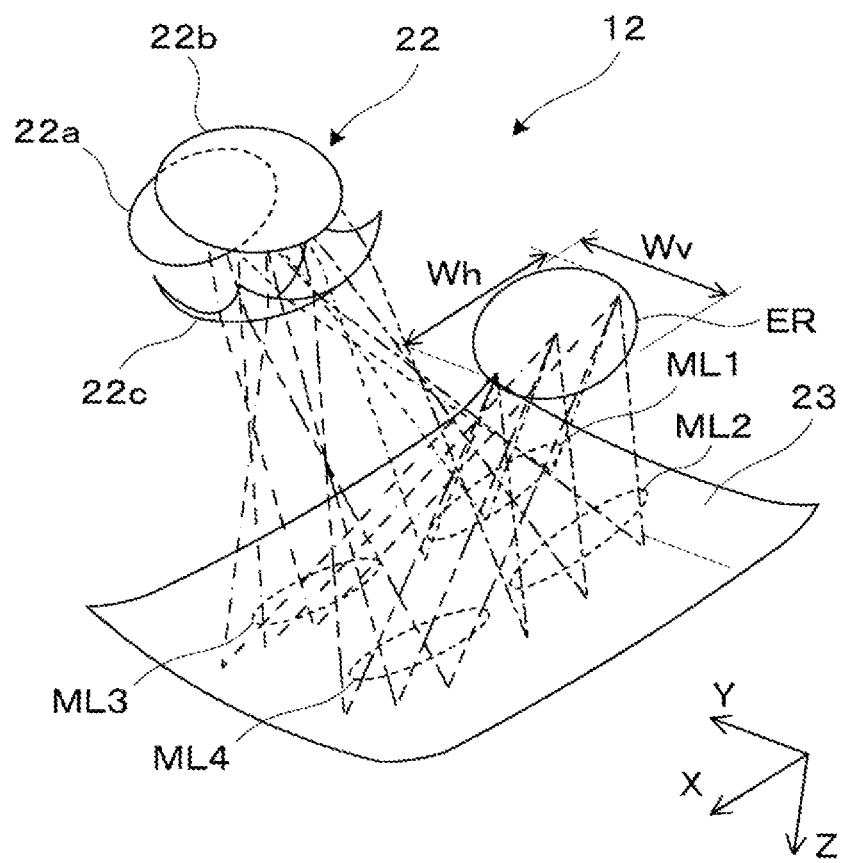
FIG. 5 is a perspective view schematically illustrating image formation performed by a projection optical system.

FIG. 5 is a perspective view schematically illustrating image formation performed by the projection optical system 12. In the drawing, an image light ML1 indicates a light beam from the upward-right direction in the visual field, an image light ML2 indicates a light beam from the downward-right direction in the visual field, an image light ML3 indicates a light beam from the upward-left direction in the visual field, and an image light ML4 indicates a light beam from the downward-left direction in the visual field. In this case, the eye ring ER that is set at the pupil position PP has a lateral pupil size WH in the lateral direction or the X direction perpendicular to the off-axis surface SO. The lateral pupil size Wh has an eye ring shape or a pupil size that is larger than a vertical pupil size Wv in the vertical direction or the Y direction orthogonal to the optical axis AX on the off-axis surface SO. Specifically, the pupil size at the pupil position is larger in the lateral direction or the X direction orthogonal to the off-axis surface SO than in the vertical direction or the Y direction orthogonal to the lateral direction. In a case where the lateral angle of view or visual field is larger than the vertical angle of view or visual field, when a line-of-sight is changed in accordance with the angle of view, the position of the eye largely moves in the lateral direction. Thus, the pupil size is preferably increased in the lateral direction. Specifically, the line-of-sight is largely changed in the lateral direction, the image can be prevented or suppressed from being cut by setting when the lateral pupil size Wh of the eye ring ER to be larger than the vertical pupil size Wv. In a case of the projection optical system 12 illustrated in FIG. 4, the FOV is large in the lateral direction, and is small in the vertical direction. As a result, the eye EY or the pupil of the user US rotates within an angle range that is laterally large, and rotates within an angle range that is vertically small. Thus, in accordance with motion of the eye EY, the lateral pupil size Wh of the eye ring ER is larger than the vertical pupil size Wv of the eye ring ER. As apparent from the description given above, for example, when the FOV of the projection optical system 12 is set to be larger in the vertical direction than in the lateral direction, the lateral pupil size Wh of the eye ring ER is preferably smaller than the vertical pupil size Wv of the eye ring ER. In the above, when the optical axis AX from the see-through mirror 23 to the pupil position PP is orientated downward, the inclination of the eye ring ER and the size of the eye ring ER in a strict sense are required to be considered with coordinate systems XO, YO, and ZO orientated downward with the optical axis AX as a ZO direction, as a reference. In this case, a vertical YO direction is not the vertical direction or the Y direction in a strict sense. However, in a case where the inclination as described above is not large, when consideration is taken with the coordinate systems X, Y, and Z, a problem is not caused in the inclination of the eye ring ER and the size of the eye ring ER in an approximate sense.

Although illustration is omitted, when the FOV of the projection optical system 12 is larger in the lateral direction than in the vertical direction in accordance with a size relationship between the lateral pupil size Wh and the vertical pupil size Wv of the eye ring ER, the intermediate pupil IP is also preferably set so that the lateral pupil size in the X direction is smaller than the vertical pupil size in the Y direction.

Figure 6:
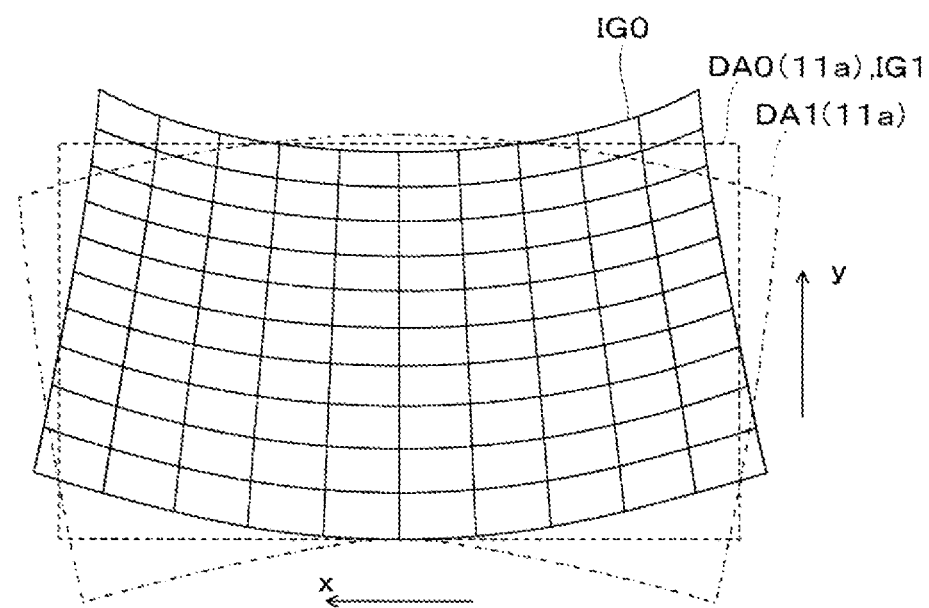
FIG. 6 is a diagram illustrating a compulsory distortion of a display image formed on a display element.

As illustrated in FIG. 6, an actual projection image IG0 expressing the image formation state by the projection optical system 12 has a relatively large distortion. The projection optical system 12 is the off-axis system 112, and hence it is not easy to remove all distortion such as a trapezoidal distortion. Thus, in a case where an original display image is indicated with DA0 even when a distortion remains in the projection optical system 12, an image to be formed on the display surface 11a is indicated as a modification image DA1 with a trapezoidal distortion provided with a distortion in advance. Specifically, the image displayed on the display element 11 has a reversed distortion that cancels the distortion formed by the projection lens 21, the prism 22, and the see-through mirror 23. With this, pixel arrangement of a virtual projection image IG1 observed at the pupil position PP through the projection optical system 12 can be a lattice pattern corresponding to the original display image DA0, and the contour can be rectangular. As a result, distortion aberration generated at the see-through mirror 23 or the like is allowed, and aberration as a whole including the display element 11 can be suppressed. When the display surface 11a is rectangular, a margin is formed by forming a compulsory distortion, but additional information may be displayed in such a margin. The display image DA1 formed on the display surface 11a is not limited to a display image in which a compulsory distortion is formed by image processing, and, for example, an array of display pixels formed on the display surface 11a may correspond to a compulsory distortion. In this case, image processing for correcting the distortion is not required. Further, the display surface 11a may be curved to correct aberration.

In the virtual image display apparatus 100 according to the first exemplary embodiment described above, the prism 22 enables correction of aberration and improvement of a resolution. Thus, size reduction of the optical system and size reduction of the apparatus as a whole can be achieved. On the off-axis surface SO of the off-axis system 112 in the apparatus, the intermediate pupil IP is arranged closer to the incident surface 22a of the prism 22 with respect to the projection lens 21 and the internal reflecting surface 22b between the projection lens 21 and the internal reflecting surface 22b. Thus, the optical system is prevented from being increased in size, and telecentricity is more easily secured on the display element 11 side. Further, the intermediate pupil IP is arranged at this position, and hence a focal distance is easily reduced, and a magnification is easily increased. Thus, while the display element 11 approaches the prism 22 and the like, the display element 11 can be small. In the apparatus, the intermediate image IM is formed between the prism 22 and the see-through mirror 23, and hence the prism 22 can be small. Further, the intermediate image IM is formed at this position, and thus color aberration and other aberration can be reduced by an action of the optical system being a pair of the projection lens 21 and the prism 22.

Second Embodiment

Now, a virtual image display apparatus and the like according to a second exemplary embodiment of the present disclosure are described. Note that the virtual image display apparatus according the second exemplary embodiment is obtained by modifying a part of the virtual image display apparatus according to the first exemplary embodiment, and description on common portions is omitted.

Figure 7:
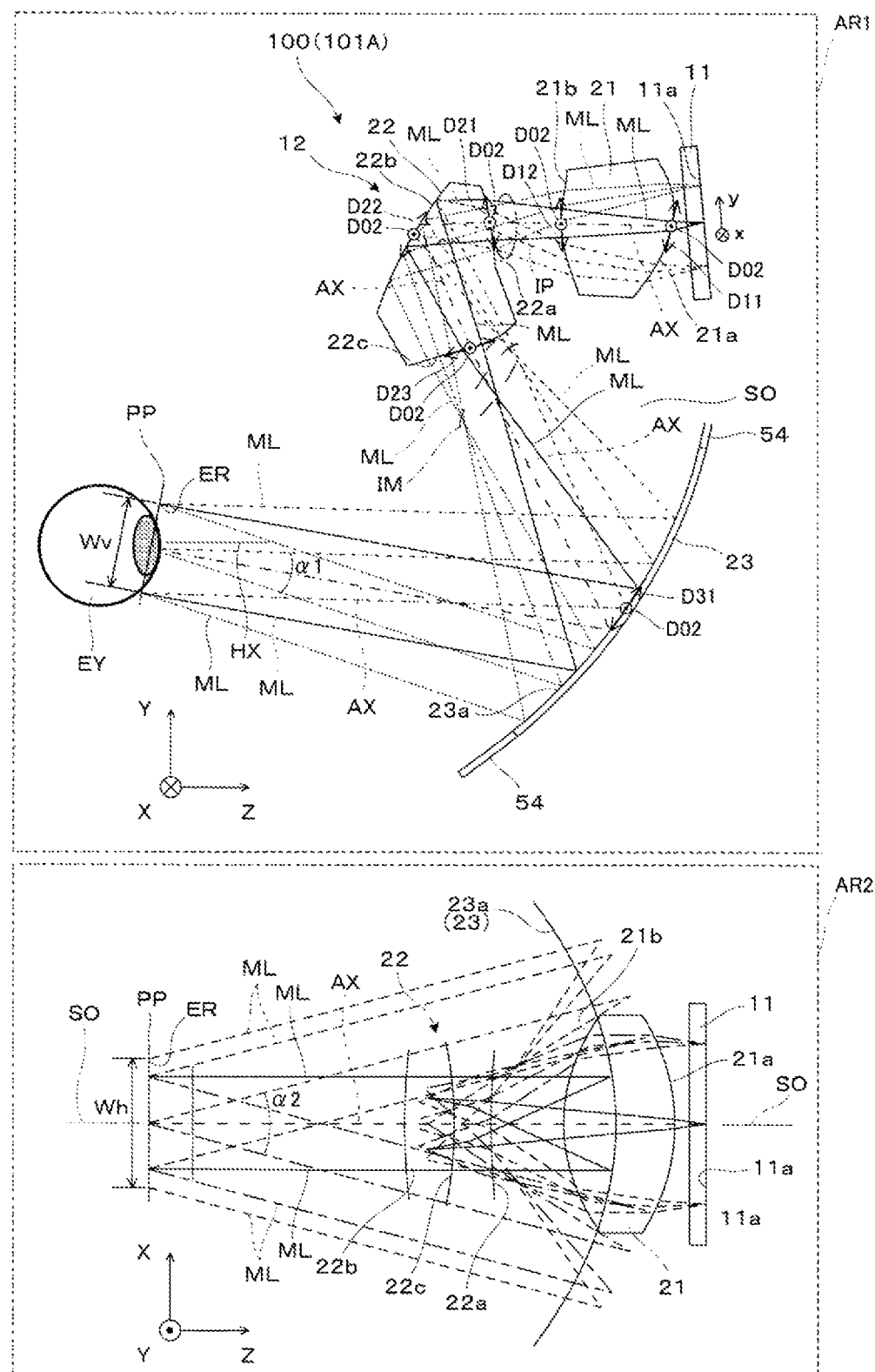
FIG. 7 is a side cross-sectional view and a plan view illustrating an optical system incorporated in a virtual image display apparatus according to a second exemplary embodiment.

With reference to FIG. 7, an optical system of the virtual display apparatus according to the second exemplary embodiment is described. In FIG. 7, the area AR1 indicates a side cross-sectional view of the projection optical system 12, and the area AR2 indicates a plan view of the projection optical system 12. The projection optical system 12 that is illustrated has a FOV of 34 degrees. The display area for the virtual image, which is performed by the projection optical system 12, is rectangular, and 44 degrees described above corresponds to a diagonal direction. The projection optical system (light-guiding device) 12 includes the projection lens 21, the prism 22, and the see-through mirror 23, and is an off-axis system. The projection lens 21, the prism 22, and the see-through mirror 23 are formed to be free curved surfaces or aspherical surfaces, have asymmetry with respect to the vertical direction and symmetry with respect to the lateral direction. With those points, features shared commonly with the device in the first exemplary embodiment are provided. Further, the off-axis surface SO through which the optical axis AX passes, the intermediate pupil IP is arranged between the projection lens 21 and the internal reflecting surface 22b of the prism 22 on the side closer to the incident surface 22a of the prism 22 with respect to the projection lens 21 and the internal reflecting surface 22b. The intermediate image IM is formed between the prism 22 and the see-through mirror 23, and is formed closer to the prism 22 with respect to the see-through mirror 23.

In the projection optical system 12 in the second exemplary embodiment, the position of the light beam passing through the uppermost side in the vertical direction is equal to or less than 30 mm with respect to the vertical direction or the Y direction with the pupil position PP as a reference, more specifically, the center thereof as a reference. Further, in the projection optical system 12, the position of all the light beams from the see-through mirror 23 to the display element 11 is 13 mm or more with respect to the front surface direction or the Z direction with the pupil position PP as a reference. Further, in the projection optical system 12, the position of all the light beams from the see-through mirror 23 to the display element 11 is 40 mm or less with respect to the front surface direction or the Z direction with the pupil position PP as a reference.

EXAMPLES

Now, examples in which the virtual image display apparatus 100 according to the first exemplary embodiment was realized is described. In data of Examples, a free curved surface is expressed in an xy polynomial surface. A coefficient of the xy polynomial surface is given with z as an optical axial direction by the following equation:

$$Z(x, y) = \frac{c(x^2 + y^2)}{1 + \sqrt{1 - (1+k)*c^2*(x^2+y^2)}} + \sum_{n,m}(A_{n,m}*(x/r0)^n*(y/r0)^m)$$

where
x, y, z: Coordinate axes in the local coordinate system,
c: Curvature (=1/R),
$A_{n, m}$: Aspherical surface coefficients,
(n indicating a degree of x, m indicating a degree of y, A indicating a coefficient of the degree)
r0: Normalized radius,
k: Korenich coefficient,
r: Distance in the radial direction ($r=\sqrt{(x^2+y^2)}$).

Table 1 given below is a table summarizing the aspherical surface coefficients $A_{n, m}$ of the polynomials that provide a free curved constituting the optical system in Example 1. A unit of a distance in the table is mm. In Table 1, each surface is described with the pupil position PP (FIG. 3), more specifically, the center thereof as a starting point.

TABLE 1

| Surface | Reflecting surface 23a of see-through mirror | Prism mirror | | | Projection lens | |
|---|---|---|---|---|---|---|
| | | Emission surface 22c | Internal reflecting surface 22b | Incident surface 22a | Emission surface 21b | Incident surface 21a |
| r0 | 10 | 10 | 10 | 10 | 10 | 10 |
| c | 0.00E+00 | 7.69E−02 | 0.00E+00 | 8.82E−02 | 0.00E+00 | 0.00E+00 |
| k | 0 | 0 | 0 | 0 | 0 | 0 |

| n | m | Value of $A_{n, m}$ | | | | | |
|---|---|---|---|---|---|---|---|
| 1 | 0 | 0.00E+00 | 0.00E+00 | 0.00E+00 | 0.00E+00 | 0.00E+00 | 0.00E+00 |
| 0 | 1 | 0.00E+00 | 0.00E+00 | 0.00E+00 | 0.00E+00 | 0.00E+00 | 1.39E+01 |
| 2 | 0 | 5.63E+00 | 3.12E−01 | 3.12E+00 | −1.13E+01 | 9.05E+00 | −6.42E+00 |
| 1 | 1 | 0.00E+00 | 0.00E+00 | 0.00E+00 | 0.00E+00 | 0.00E+00 | 0.00E+00 |
| 0 | 2 | 1.70E+00 | 6.23E+00 | −5.47E+00 | 3.77E−01 | −6.65E+00 | −1.79E+01 |
| 3 | 0 | 0.00E+00 | 0.00E+00 | 0.00E+00 | 0.00E+00 | 0.00E+00 | 0.00E+00 |
| 2 | 1 | 1.25E+01 | 5.40E−01 | −2.63E+00 | −1.06E+02 | −3.82E+01 | 1.66E+01 |
| 1 | 2 | 0.00E+00 | 0.00E+00 | 0.00E+00 | 0.00E+00 | 0.00E+00 | 0.00E+00 |
| 0 | 3 | 1.84E+00 | 9.34E+00 | 1.45E+00 | −2.36E+01 | 2.22E+01 | −1.64E+01 |
| 4 | 0 | −8.92E−01 | −1.49E+00 | 2.38E+01 | 3.91E−01 | −5.35E−01 | 4.60E+00 |
| 3 | 1 | 0.00E+00 | 0.00E+00 | 0.00E+00 | 0.00E+00 | 0.00E+00 | 0.00E+00 |
| 2 | 2 | 8.07E+00 | −5.78E+00 | 1.35E+00 | −1.90E+02 | 8.06E+01 | −1.25E+01 |
| 1 | 3 | 0.00E+00 | 0.00E+00 | 0.00E+00 | 0.00E+00 | 0.00E+00 | 0.00E+00 |
| 0 | 4 | 4.15E−01 | −1.94E+01 | −3.51E−02 | −3.10E+01 | 4.12E+00 | 3.56E+01 |
| 5 | 0 | 0.00E+00 | 0.00E+00 | 0.00E+00 | 0.00E+00 | 0.00E+00 | 0.00E+00 |
| 4 | 1 | −1.08E+00 | 8.10E+00 | −2.25E+01 | −1.02E+01 | 7.46E+00 | −3.67E+01 |
| 3 | 2 | 0.00E+00 | 0.00E+00 | 0.00E+00 | 0.00E+00 | 0.00E+00 | 0.00E+00 |
| 2 | 3 | 2.44E+00 | 7.62E+00 | −2.75E−01 | −1.02E+02 | −8.30E+01 | 1.72E+01 |
| 1 | 4 | 0.00E+00 | 0.00E+00 | 0.00E+00 | 0.00E+00 | 0.00E+00 | 0.00E+00 |
| 0 | 5 | 1.60E−03 | 1.03E+01 | −1.30E−02 | −1.43E+01 | −3.39E+01 | −2.15E+01 |
| 6 | 0 | −5.94E−02 | | −1.56E+01 | | | |
| 5 | 1 | 0.00E+00 | | 0.00E+00 | | | |
| 4 | 2 | −5.80E−01 | | 6.72E+00 | | | |
| 3 | 3 | 0.00E+00 | | 0.00E+00 | | | |
| 2 | 4 | 2.03E−01 | | 8.24E−02 | | | |
| 1 | 5 | 0.00E+00 | | 0.00E+00 | | | |
| 0 | 6 | −1.11E−02 | | 1.41E−03 | | | |
| 7 | 0 | 0.00E+00 | | 0.00E+00 | | | |
| 6 | 1 | −2.52E−02 | | 8.91E+00 | | | |
| 5 | 2 | 0.00E+00 | | 0.00E+00 | | | |
| 4 | 3 | −1.46E−01 | | −6.41E−01 | | | |
| 3 | 4 | 0.00E+00 | | 0.00E+00 | | | |
| 2 | 5 | −5.85E−02 | | −2.83E−02 | | | |
| 1 | 6 | 0.00E+00 | | 0.00E+00 | | | |
| 0 | 7 | −1.52E−04 | | −1.04E−03 | | | |
| 8 | 0 | 5.66E−03 | | 0.00E+00 | | | |

TABLE 1-continued

| | | | |
|---|---|---|---|
| 7 | 1 | 0.00E+00 | 0.00E+00 |
| 6 | 2 | −1.77E−03 | −1.30E+00 |
| 5 | 3 | 0.00E+00 | 0.00E+00 |
| 4 | 4 | −1.58E−02 | 0.00E+00 |
| 3 | 5 | 0.00E+00 | 0.00E+00 |
| 2 | 6 | −1.16E−02 | 3.66E−03 |
| 1 | 7 | 0.00E+00 | 0.00E+00 |
| 0 | 8 | 1.04E−04 | 1.65E−04 |

Table 2 given below shows inclination and optical original point positions of free curved surfaces constituting the optical system in Example 1. In Table 2, the global coordinate axes XYZ in the whole system are described with the pupil position PP (FIG. 3) as the original point. α, β, and γ indicate rotary angles about the XYZ axes in the local coordinate system.

TABLE 2

| | Target surface | X | Y mm | Z | α | β degrees | γ |
|---|---|---|---|---|---|---|---|
| | Pupil position PP | 0 | 0 | 0 | −10 | 0 | 0 |
| | Reflecting surface 23a of see-through mirror | 0 | 21.9 | 36.2 | −0.3 | 0 | 0 |
| Prism | Emission surface 22c | 0 | 13.0 | 16.3 | −83.0 | 0 | 0 |
| | Mirror surface 22b | 0 | −14.0 | 5.7 | −45.6 | 0 | 0 |
| | Incident surface 22a | 0 | 29.6 | 23.2 | 3.0 | 0 | 0 |
| Lens | Emission surface 21b | 0 | 18.5 | 26.1 | −1.7 | 0 | 0 |
| | Incident surface 21a | 0 | 18.4 | 29.1 | −1.7 | 0 | 0 |
| | Cover glass of display element 11 | 0 | 21.4 | 32.6 | −4.6 | 0 | 0 |
| | Display image 11a | 0 | 21.3 | 33.7 | −4.6 | 0 | 0 |

Modification Examples and Others

The present disclosure is described according to the above-mentioned exemplary embodiments, but the present disclosure is not limited to the above-mentioned exemplary embodiments. The present disclosure may be carried out in various modes without departing from the gist of the present disclosure, and, for example, the following modifications may be carried out.

In the virtual image display apparatus 100 in the above-described exemplary embodiments, a self-luminous type display device such as an organic EL element, an LCD, or other light modulating elements are used as the display element 11. Instead, a configuration in which a laser scanner obtained by combining a laser light source and a scanner such as a polygon mirror may also be used. Specifically, the present disclosure is applicable to a laser retina projection type head-mounted display.

A light control device that controls light by limiting light passing through the see-through mirror 23 may be attached to the external side of the see-through mirror 23. The light control device adjusts a transmittance, for example, electrically. Mirror liquid crystals, electronic shades, and the like may be used as the light control device. The light control device may adjust a transmittance according to external light brightness. When the light control device blocks the external light OL, only a virtual image that is not affected by an external image can be observed. Further, the virtual image display apparatus of the claimed disclosure is applicable to a so-called closed-type head-mounted display device (HMD) that blocks external light and causes only imaging light to be visually recognized. In this case, the HMD may also be compatible with a so-called see-through video product constituted by a virtual image display apparatus and an imaging device.

In the description above, the virtual image display apparatus 100 is assumed to be mounted and used on a head, but the virtual image display apparatus 100 described above may also be used as a hand-held display that is not mounted on a head and is viewed into it like a pair of binoculars. In other words, the head-mounted display also includes a hand-held display in the present disclosure.

The off-axis surface SO is set in the vertical direction or the Y direction as described above. However, lateral installation or lateral development in which the off-axis surface SO is set in the lateral direction or the X direction may be adopted.

A virtual image display apparatus in a specific mode includes a display element, a projection lens configured to converge image light emitted from the display element, a prism configured to cause the image light emitted from the projection lens to enter an incident surface thereof while refracting the image light and totally reflect the image light by an internal reflecting surface thereof and moreover emit the image light from an emission surface thereof while refracting the image light, and a see-through mirror configured to reflect the image light emitted from the prism toward a pupil position. The projection lens, the prism, and the see-through mirror are arranged to form an off-axis system. At an off-axis surface of the off-axis system, an intermediate pupil is arranged between the projection lens and the internal reflecting surface, the intermediate pupil being arranged to be farther to the incident surface side of the prism than to the projection lens and the internal reflecting surface, and an intermediate image is formed between the prism and the see-through mirror, with the intermediate image being formed by image formation by the image light.

In the virtual image display apparatus, the prism enables correction of aberration and improvement of a resolution. Thus, size reduction of the optical system and size reduction of the apparatus as a whole can be achieved. On the off-axis surface of the off-axis system in the apparatus, the intermediate pupil is arranged closer to the incident surface of the prism with respect to the projection lens and the internal reflecting surface between the projection lens and the internal reflecting surface. Thus, the optical system is prevented from being increased in size, and telecentricity is more easily secured on the display element side. Further, the intermediate pupil is arranged at this position, and hence a focal distance is easily reduced, and a magnification is easily increased. Thus, while the display element approaches the prism and the like, the display element can be small. In the apparatus, the intermediate image is formed between the prism and the see-through mirror, and hence the prism can be small. Further, the intermediate image is formed at this position, and thus color aberration and other aberration can be reduced by an action of the optical system being a pair of the projection lens and the prism.

In a specific aspect, at the off-axis surface of the off-axis system, an optical path from the projection lens to the internal reflecting surface, an optical path from the internal reflecting surface to the see-through mirror, an optical path from the see-through mirror to the pupil position are arranged to be folded twice to have a Z-like shape. In this case, due to the folded optical paths, the display element and the projection lens can be accommodated in a small space.

In another aspect, the projection lens includes a free curved surface as an optical surface. In this case, the number of constituent elements of the projection lens can be reduced, and high accuracy can be achieved.

Further, in another aspect, the projection lens has an emission surface and an incident surface in an optical path of a main optical beam from a center of a display surface, the emission surface being formed to be inclined with respect to the incident surface. In this case, due to relative inclination of the incident surface and the emission surface, a function of compensating eccentricity of the off-axis system can be exerted, which contribute to improvement of various aberration. Further, relative inclination of the incident surface and the emission surface may cause the projection lens to have a function of compensating color aberration.

Further, in another aspect, in the optical path of the main optical beam from the center of the display surface, a distance between the see-through mirror and the prism is equal to or less than a distance between the see-through mirror and the pupil position. In this case, a projection amount by which the prism protrudes in a periphery (upward-and-downward direction and right-and-left direction) of the see-through mirror can be suppressed.

Further, in another aspect, the see-through mirror has a shape in which an original point in a curved surface expression is shifted to the projection lens side from an effective area of the see-through mirror. In this case, without putting an excessive load to design of the optical system, an inclination surface of the see-through mirror, which achieves the Z-like shape optical paths, can be set.

Further, in another aspect, an image displayed at the display element has a distortion that cancels a distortion formed by the projection lens, the prism, and the see-through mirror. In this case, distortion aberration generated at the see-through mirror or the like is allowed, and aberration as a whole including the display element can be suppressed.

Further, in another aspect, the see-through mirror includes a front reflecting surface that is transmissive. In this case, aberration or a ghost can be prevented from being caused in a reflected image by the see-through mirror, that is, a virtual image observed by a user.

Further, in another aspect, the intermediate image is formed closer to the prism than to the see-through mirror. In this case, a load of magnification due to the see-through mirror is reduced, and hence aberration of a virtual image to be observed can be suppressed.

Further, in another aspect, the projection lens, the prism, and the see-through mirror have an optically symmetric shape with respect to a direction orthogonal to the off-axis surface of the off-axis system. In this case, the intersecting direction orthogonal to the off-axis surface is close to general optical design.

Further, in another aspect, a direction orthogonal to the off-axis surface corresponds to a lateral direction in which eyes are aligned, and the prism has a lateral width in the lateral direction, the lateral width being larger than a vertical width in a vertical direction orthogonal to the lateral direction. In this case, the angle of view in the lateral direction can be increased. Further, even when the line-of-sight is largely changed in the lateral direction correspondingly to the eye that moves largely in the lateral direction, the image can be visually recognized.

Further, in another aspect, the projection lens is arranged to be interposed between the prism and the display element in the lateral direction orthogonal to the off-axis surface and in a front surface direction orthogonal to the vertical direction orthogonal to the lateral direction. In this case, the optical path from the prism to the display element is close to the front surface direction, and the optical paths from the projection lens to the pupil position through the prism and the see-through mirror can be easily arranged while being folded twice in a Z-like shape, as seen in the lateral direction.

Further, in another aspect, with the pupil position serving as a reference, a position of a light beam passing though an uppermost side in the vertical direction is 30 mm or less with respect to the vertical direction in parallel with the off-axis surface and parallel with a pupil surface of the pupil position. In this case, an amount by which the projection lens and the display element expand upward of an eyebrow can be suppressed. With this, designability can be secured.

Further, in another aspect, with the pupil position serving as a reference, a position of all light beams from the see-through mirror to the display element is 13 mm or more with respect to a front direction in parallel with the off-axis surface and intersecting the pupil surface of the pupil position. In this case, a space for arranging an inner lens can be easily secured behind the see-through mirror.

Further, in another aspect, with the pupil position serving as a reference, a position of all light beams from the see-through mirror to the display element is 40 mm or less with respect to a front direction in parallel with the off-axis surface and intersecting the pupil surface of the pupil position. In this case, the see-through mirror, the display element, and the like are prevented from protruding frontward, and thus designability can be secured easily.

Further, in another aspect, the pupil size at the pupil position is larger in the lateral direction orthogonal to the off-axis surface than in the vertical direction orthogonal to the lateral direction. In a case where the lateral angle of view is increased, when a line-of-sight is changed in accordance with the angle of view, the position of the eye largely moves in the lateral direction. Thus, the pupil size is preferably increased in the lateral direction.

A light-guiding device in a specific mode includes a projection lens configured to converge image light emitted from a display element, a prism configured to cause the image light emitted from the projection lens to enter an incident surface thereof while refracting the image light and totally reflect the image light by an internal reflecting surface thereof and moreover emit the image light from an emission surface thereof while refracting the image light, and a see-through mirror configured to reflect the image light emitted from the prism toward a pupil position. The projection lens, the prism, and the see-through mirror are arranged to form an off-axis system. At an off-axis surface of the off-axis system, an intermediate pupil is arranged between the projection lens and the internal reflecting surface, with the intermediate pupil being arranged to be farther to the incident surface side of the prism than to the projection lens and the internal reflecting surface, and an intermediate image is formed between the prism and the see-through mirror, with the intermediate image being formed by image formation by the image light.

In the virtual image display apparatus, the prism enables correction of aberration and improvement of a resolution.

Thus, size reduction of the apparatus as a whole can be achieved. Further, on the off-axis surface, the intermediate pupil is arranged closer to the incident surface of the prism with respect to the projection lens and the internal reflecting surface. Thus, the optical system is prevented from being increased in size, and telecentricity is more easily secured on the display element side. Further, a focal distance is easily reduced, and a magnification is easily increased. Thus, while the display element approaches the prism and the like, the display element can be small. In the apparatus, the intermediate image is formed between the prism and the see-through mirror, and hence the prism can be small. Color aberration and other aberration can be reduced by an action of the optical system being a pair of the projection lens and the prism.

What is claimed is:

1. A virtual image display apparatus comprising:
    a display element;
    a projection lens configured to converge image light emitted from the display element;
    a prism configured to cause the image light emitted from the projection lens to enter an incident surface thereof while refracting the image light and totally reflect the image light by an internal reflecting surface thereof and moreover emit the image light from an emission surface thereof while refracting the image light; and
    a see-through mirror configured to reflect the image light emitted from the prism toward a pupil position, wherein
    the projection lens, the prism, and the see-through mirror are arranged to form an off-axis system, and
    at an off-axis surface of the off-axis system, an intermediate pupil is arranged between the projection lens and a reflective surface inside the prism, the reflective surface inside the prism being the internal reflecting surface, with the intermediate pupil being arranged to be farther to the incident surface of the prism than to the projection lens and the reflective surface inside the prism, and an intermediate image is formed between the prism and the see-through mirror, with the intermediate image being formed by image formation by the image light.

2. The virtual image display device according to claim 1, wherein
    at the off-axis surface, an optical path from the projection lens to the internal reflecting surface, an optical path from the internal reflecting surface to the see-through mirror, and an optical path from the see-through mirror to the pupil position are arranged to be folded twice to have a Z-like shape.

3. The virtual image display device according to claim 1, wherein
    the projection lens includes a free curved surface as an optical surface.

4. The virtual image display device according to claim 3, wherein
    the projection lens has an emission surface and an incident surface in an optical path of a main optical beam from a center of a display surface, the emission surface being formed to be inclined with respect to the incident surface.

5. The virtual image display device according to claim 4, wherein
    in the optical path of the main optical beam from the center of the display surface, a distance between the see-through mirror and the prism is equal to or less than a distance between the see-through mirror and the pupil position.

6. The virtual image display device according to claim 1, wherein
    the see-through mirror has a shape in which an original point in a curved surface expression is shifted to the projection lens side from an effective area of the see-through mirror.

7. The virtual image display device according to claim 1, wherein
    an image displayed at the display element has a distortion that cancels a distortion formed by the projection lens, the prism, and the see-through mirror.

8. The virtual image display apparatus according to claim 1, wherein
    the see-through mirror includes a front reflecting surface that is transmissive.

9. The virtual image display device according to claim 1, wherein
    the intermediate image is formed closer to the prism than to the see-through mirror.

10. The virtual image display device according to claim 1, wherein
    the projection lens, the prism, and the see-through mirror have an optically symmetric shape with respect to a direction orthogonal to the off-axis surface of the off-axis system.

11. The virtual image display device according to claim 10, wherein
    a direction orthogonal to the off-axis surface corresponds to a lateral direction in which eyes are aligned, and the prism has a lateral width in the lateral direction, the lateral width being larger than a vertical width in a vertical direction orthogonal to the lateral direction.

12. The virtual image display device according to claim 10, wherein
    the projection lens is arranged to be interposed between the prism and the display element in the lateral direction orthogonal to the off-axis surface and in a front surface direction orthogonal to the vertical direction orthogonal to the lateral direction.

13. The virtual image display device according to claim 10, wherein
    with the pupil position serving as a reference, a position of a light beam passing through an uppermost side in the vertical direction is 30 mm or less with respect to the vertical direction in parallel with the off-axis surface and parallel with a pupil surface of the pupil position.

14. The virtual image display device according to claim 10, wherein
    with the pupil position serving as a reference, a position of all light beams from the see-through mirror to the display element is 13 mm or more with respect to a front direction in parallel with the off-axis surface and intersecting the pupil surface of the pupil position.

15. The virtual image display device according to claim 10, wherein
    with the pupil position serving as a reference, a position of all light beams from the see-through mirror to the display element is 40 mm or less with respect to the front direction in parallel with the off-axis surface and intersecting the pupil surface of the pupil position.

16. The virtual image display device according to claim 10, wherein
- a pupil size at the pupil position is larger in the lateral direction orthogonal to the off-axis surface than in the vertical direction orthogonal to the lateral direction.

17. A light-guiding device comprising:
- a projection lens configured to converge image light emitted from a display element;
- a prism configured to cause the image light emitted from the projection lens to enter an incident surface thereof while refracting the image light and totally reflect the image light by an internal reflecting surface thereof and moreover emit the image light from an emission surface thereof while refracting the image light; and
- a see-through mirror configured to reflect the image light emitted from the prism toward a pupil position, wherein
- the projection lens, the prism, and the see-through mirror are arranged to form an off-axis system, and
- at an off-axis surface of the off-axis system, an intermediate pupil is arranged between the projection lens and a reflective surface inside the prism, the reflective surface inside the prism being the internal reflecting surface, with the intermediate pupil being arranged to be farther to the incident surface of the prism than to the projection lens and the reflective surface inside the prism, and an intermediate image is formed between the prism and the see-through mirror, with the intermediate image being formed by image formation by the image light.

* * * * *